US012616935B2

(12) United States Patent
Kim et al.

(10) Patent No.: US 12,616,935 B2
(45) Date of Patent: May 5, 2026

(54) AIR PURIFICATION APPARATUS AND AIR PURIFICATION METHOD USING THE SAME

(71) Applicant: SAMSUNG ELECTRONICS CO., LTD., Suwon-si (KR)

(72) Inventors: Byungnam Kim, Daejeon (KR); Youn-Mook Lim, Daejeon (KR); Huisu Kim, Daejeon (KR); Jin Mun Yun, Daejeon (KR); Daeok Kim, Suwon-si (KR); Yeongwoo Yim, Suwon-si (KR)

(73) Assignees: SAMSUNG ELECTRONICS CO., LTD., Suwon-si (KR); KOREA ATOMIC ENERGY RESEARCH INSTITUTE, Daejeon (KR)

( * ) Notice: Subject to any disclaimer, the term of this patent is extended or adjusted under 35 U.S.C. 154(b) by 493 days.

(21) Appl. No.: 18/124,239

(22) Filed: Mar. 21, 2023

(65) Prior Publication Data

US 2024/0017208 A1 Jan. 18, 2024

(30) Foreign Application Priority Data

Jul. 14, 2022 (KR) ........................ 10-2022-0086766

(51) Int. Cl.
| | |
|---|---|
| *B01D 53/32* | (2006.01) |
| *B01D 53/00* | (2006.01) |
| *B60H 3/00* | (2006.01) |

(52) U.S. Cl.
CPC ......... *B01D 53/323* (2013.01); *B01D 53/007* (2013.01); *B60H 3/0078* (2013.01); *B01D 2259/812* (2013.01)

(58) Field of Classification Search
CPC .................................................... B01D 53/323
See application file for complete search history.

(56) References Cited

U.S. PATENT DOCUMENTS

| | | | |
|---|---|---|---|
| 5,523,577 A | 6/1996 | Schonberg et al. | |
| 6,179,968 B1 | 1/2001 | Izutsu et al. | |
| 6,628,750 B1 * | 9/2003 | Korenev ................. | G21K 5/04 378/68 |
| 7,547,892 B2 | 6/2009 | Avnery | |
| 2001/0002242 A1 | 5/2001 | Lee et al. | |

(Continued)

FOREIGN PATENT DOCUMENTS

| | | |
|---|---|---|
| JP | 2004-290261 A | 10/2004 |
| KR | 2000-0009579 A | 2/2000 |

(Continued)

*Primary Examiner* — Kevin Joyner
(74) *Attorney, Agent, or Firm* — Sughrue Mion, PLLC

(57) ABSTRACT

Air purification apparatuses and methods are provided. An air purification apparatus includes an air purification chamber and a supply chamber coupled to the air purification chamber. The air purification chamber includes a purification reactor, a first electron accelerator that irradiates a first electron beam to the purification reactor, and a second electron accelerator that irradiates a second electron beam to the purification reactor. The supply chamber includes a power supply that supplies power to each of the first electron accelerator and the second electron accelerator. The second electron accelerator is opposite to the first electron accelerator across the purification reactor.

20 Claims, 9 Drawing Sheets

(56) References Cited

U.S. PATENT DOCUMENTS

| | | | | |
|---|---|---|---|---|
| 2006/0076507 | A1 * | 4/2006 | Avnery | A61L 9/18 |
| | | | | 250/455.11 |
| 2007/0148060 | A1 * | 6/2007 | Klenov | B01D 53/007 |
| | | | | 422/186.04 |
| 2012/0145929 | A1 * | 6/2012 | Nishino | A61L 2/087 |
| | | | | 250/492.3 |
| 2021/0402344 | A1 | 12/2021 | Kim et al. | |

FOREIGN PATENT DOCUMENTS

| | | | | |
|---|---|---|---|---|
| KR | 20-0285698 Y1 | 8/2002 | | |
| KR | 10-2009-0058857 A | 6/2009 | | |
| KR | 10-0957789 B1 | 5/2010 | | |
| KR | 10-2012-0071891 A | 7/2012 | | |
| KR | 10-2019-0105793 A | 9/2019 | | |
| KR | 10-2020-0132055 A | 11/2020 | | |
| KR | 10-2365372 B1 | 2/2022 | | |
| WO | WO-0239792 A2 * | 5/2002 | | H01J 35/13 |

* cited by examiner

1

AIR PURIFICATION APPARATUS AND AIR PURIFICATION METHOD USING THE SAME

CROSS-REFERENCE TO THE RELATED APPLICATION

This U.S. non-provisional application claims priority under 35 U.S.C § 119 to Korean Patent Application No. 10-2022-0086766, filed on Jul. 14, 2022, in the Korean Intellectual Property Office, the disclosure of which is hereby incorporated by reference in its entirety.

BACKGROUND

1. Field

Embodiments of the present disclosure relate to an air purification apparatus and an air purification method using the same, and more particularly, to an air purification apparatus capable of operating without interruption and an air purification method using the same.

2. Description of the Related Art

A semiconductor device may be fabricated through various processes. For example, the semiconductor device may be fabricated by a deposition process, a photolithography process, an etching process, and a cleaning process that are performed on a substrate. Various kinds of substrate processing apparatuses may be used for diverse processes performed on the substrate. The substrate processing apparatus may discharge air contacting harmful materials. Before the air is exhausted into the atmosphere from the substrate processing apparatus, it may be required to purify the harmful materials in the air. In addition, during the procedure for purifying the harmful materials such as odorous substances, it may be needed to protect heath of workers and people living nearby.

SUMMARY

Some embodiments of the present disclosure provide an air purification apparatus capable of operating without interruption and an air purification method using the same.

Some embodiments of the present disclosure provide an air purification apparatus capable of preventing radiation leakage and an air purification method using the same.

Some embodiments of the present disclosure provide an air purification apparatus capable of increasing a lifespan of an electron accelerator and an air purification method using the same.

Some embodiments of the present disclosure provide an air purification apparatus capable of eliminating odorous substances without injuring health of people nearby such as workers and an air purification method using the same.

According to embodiments of the present disclosure, an air purification apparatus is provided. The air purification apparatus includes an air purification chamber, and a supply chamber coupled to the air purification chamber. The air purification chamber includes: a purification reactor; a first electron accelerator that is configured to irradiate a first electron beam to the purification reactor; and a second electron accelerator that is configured to irradiate a second electron beam to the purification reactor. The supply chamber includes a power supply that is configured to supply power to each of the first electron accelerator and the second electron accelerator. The the second electron accelerator is opposite to the first electron accelerator across the purification reactor.

According to embodiments of the present disclosure, an air purification apparatus is provided. The air purification apparatus includes: a purification reactor; a first electron accelerator that is configured to irradiate a first electron beam to the purification reactor; a second electron accelerator that is configured to irradiate a second electron beam to the purification reactor; an inlet duct that is configured to send purification-target air to the purification reactor; an outlet duct that is configured to allow purified air to escape from the purification reactor; and a purification housing that encloses the first electron accelerator and the second electron accelerator. The outlet duct includes: a first outlet duct that extends in a first direction from the purification reactor; a second outlet duct that extends in a second direction from the first outlet duct, the second direction intersecting the first direction; and a third outlet duct that extends in a third direction from the second outlet duct, the third direction intersecting the second direction. The first outlet duct and the second outlet duct are in the purification housing.

According to embodiments of the present disclosure, an air purification method is provided. The air purification method includes: introducing air to a purification reactor of an air purification apparatus; irradiating at least one electron beam to the purification reactor; and discharging the air from the purification reactor. The air purification apparatus includes: a first electron accelerator on one side of the purification reactor; and a second electron accelerator on another side of the purification reactor. The irradiating the at least one electron beam to the purification reactor includes: stopping operation of the second electron accelerator and operating the first electron accelerator to irradiate a first electron beam to the purification reactor; and stopping operation of the first electron accelerator and operating the second electron accelerator to irradiate a second electron beam to the purification reactor.

Aspects of embodiments of the present disclosure are not limited to the aspects mentioned above, and other aspects which have not been mentioned above will be clearly understood to those skilled in the art from the following description.

Details of other example embodiments are included in the below description and drawings.

DETAILED DESCRIPTION

Figure 1:
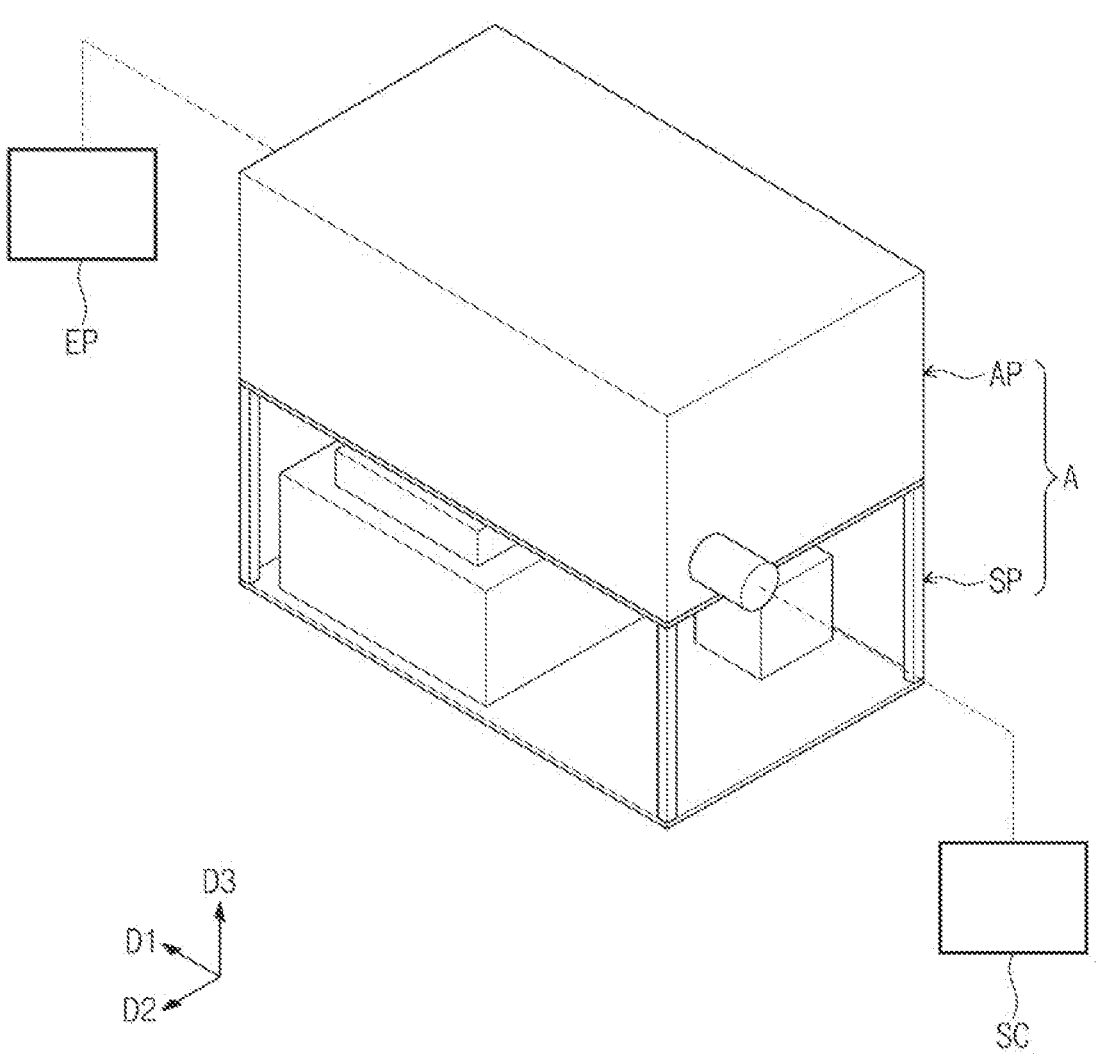
FIG. 1 illustrates a perspective view showing an air purification apparatus according to some embodiments of the present disclosure.

The following will now describe some embodiments of the present disclosure with reference to the accompanying drawings. Like reference numerals may indicate like components throughout the description.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element or layer is referred to as being "directly over," "directly above," "directly on," "directly below," "directly under," "directly beneath," "directly connected to" or "directly coupled to" another element or layer, there are no intervening elements or layers present.

FIG. 1 illustrates a perspective view showing an air purification apparatus according to some embodiments of the present disclosure.

In this description, symbol D1 may denote a first direction, symbol D2 may denote a second direction that intersects the first direction D1, and symbol D3 may denote a third direction that intersects each of the first direction D1 and the second direction D2. Each of the first direction D1 and the second direction D2 may be called a horizontal direction.

Referring to FIG. 1, an air purification apparatus A may be provided. The air purification apparatus A may purify harmful materials contain in air. For example, the air purification apparatus A may eliminate a volatile organic compound (VOC) contained in air. An offensive odor and the like may be removed while the air passes through the air purification apparatus A. The air purification apparatus A may be applicable to various fields that use air purification. For example, the air purification apparatus A may purify air discharged from a semiconductor fabrication facility SC. The air purification apparatus A may be connected to the semiconductor fabrication facility SC.

An exhaust EP may receive the air discharged from the air purification apparatus A. The exhaust EP may include a compressor that allows the air to move. The exhaust EP may exhaust the purified air to the atmosphere. The air purification apparatus A may include an air purification chamber AP and a supply chamber SP.

The air purification chamber AP may receive and purify air. For example, the air purification chamber AP may be connected to the semiconductor fabrication facility SC to receive air discharged from the semiconductor fabrication facility SC. The air purification chamber AP will be further discussed in detail below.

The supply chamber SP may supply the air purification chamber AP with power and/or cooling water. The supply chamber SP may be combined with the air purification chamber AP. For example, as shown in FIG. 1, the supply chamber SP may be coupled to the air purification chamber AP below the air purification chamber AP. The supply chamber SP and the air purification chamber AP may be formed into a single unitary body. FIG. 1 depicts that the supply chamber SP is opened at a lateral side thereof, but embodiments of the present disclosure are not limited thereto. For example, similar to the air purification chamber AP, the supply chamber SP may be closed at a lateral side thereof. The supply chamber SP will be further discussed in detail below.

Figure 2:
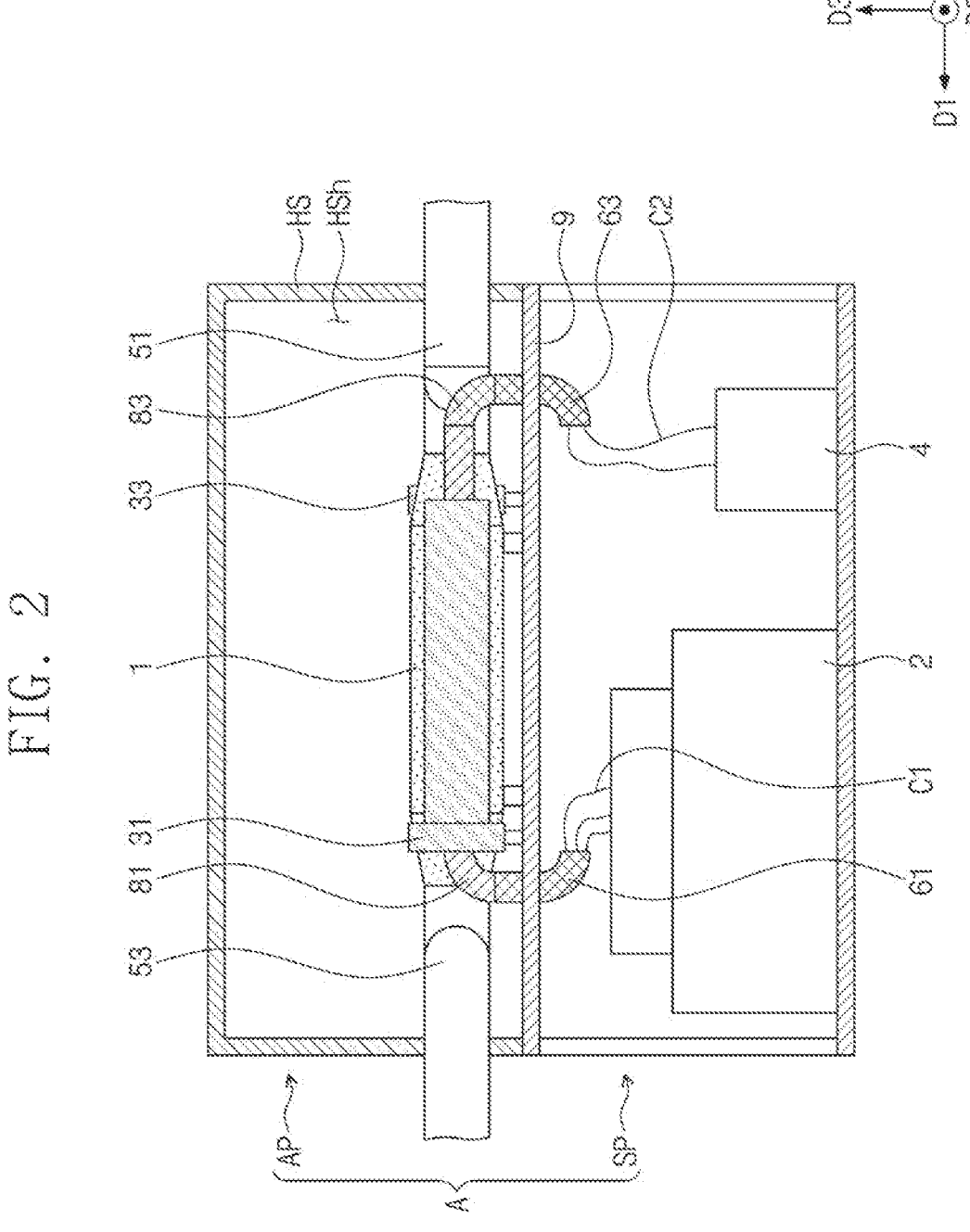
FIG. 2 illustrates a cross-sectional view showing an air purification apparatus according to some embodiments of the present disclosure.
Figure 3:
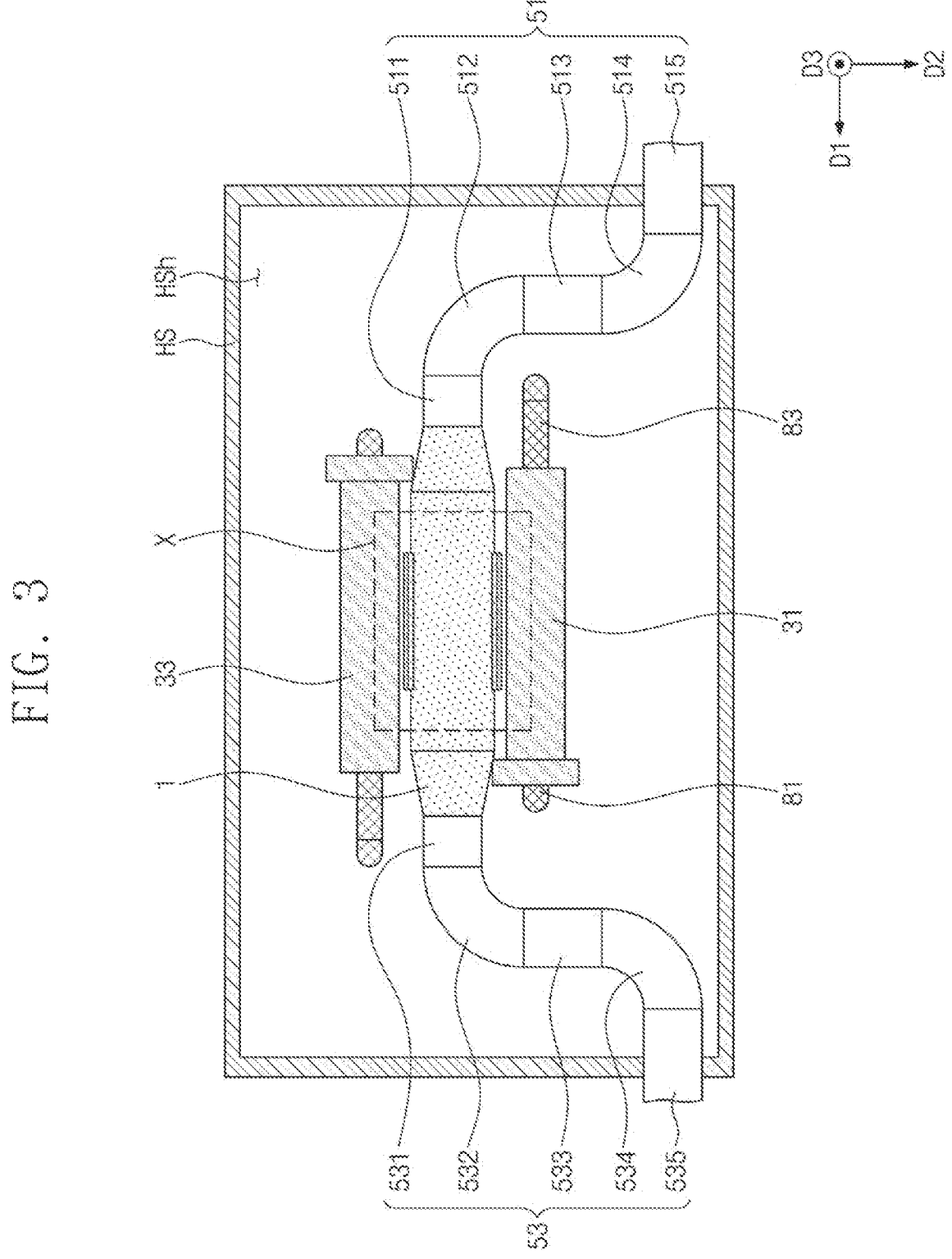
FIG. 3 illustrates a plan view showing an air purification apparatus according to some embodiments of the present disclosure.

FIG. 2 illustrates a cross-sectional view showing an air purification apparatus according to some embodiments of the present disclosure. FIG. 3 illustrates a plan view showing an air purification apparatus according to some embodiments of the present disclosure.

Referring to FIGS. 2 and 3, the air purification chamber AP may include a purification housing HS, a shield plate 9, a purification reactor 1, a first electron accelerator 31, a second electron accelerator 33, an inlet duct 51, an outlet duct 53, an upper cable shield member 81, and an upper cooling shield member 83.

The purification housing HS may provide an internal space HSh. The purification housing HS may enclose the purification reactor 1, the first electron accelerator 31, and the second electron accelerator 33. For example, the purification reactor 1, the first electron accelerator 31, and the second electron accelerator 33 may be positioned in the purification housing HS. In addition, at least a portion of each of the inlet duct 51 and the outlet duct 53 may be positioned in the purification housing HS.

The purification housing HS may block radiation leakage from the internal space HSh. The purification housing HS may include a material capable of shielding radiation. For example, the purification housing HS may include lead (Pb). The purification housing HS may have a rectangular hexahedral shape as shown in FIG. 2, but embodiments of the present disclosure are not limited thereto.

The shield plate 9 may support the purification reactor 1, the first electron accelerator 31, the second electron accelerator 33, the inlet duct 51, the outlet duct 53, the upper cable shield member 81, and the upper cooling shield member 83. The shield plate 9 may be positioned on the supply chamber SP. The shield plate 9 may be combined with the purification housing HS. The shield plate 9 may be a bottom plate of the purification housing HS. Alternatively, when the purification housing HS has a separate bottom plate, the shield plate 9 may be coupled below the bottom plate of the purification housing HS.

The shield plate 9 may prevent radiation from escaping from the internal space HSh into the supply chamber SP. The shield plate 9 may include a material capable of shielding radiation. For example, the shield plate 9 may include lead (Pb). The shield plate 9 may have a rectangular plate shape as shown in FIG. 2, but embodiments of the present disclosure are not limited thereto.

The purification reactor 1 may provide a purification space in which air purification is performed. For example, when air passes through the purification reactor 1, harmful materials may be eliminated from the air. The purification reactor 1 may be connected to the inlet duct 51 and the outlet duct 53. The purification reactor 1 will be further discussed in detail below.

The first electron accelerator 31 may be positioned in the purification housing HS. In some embodiments, the first electron accelerator 31 may be supported by the shield plate 9. The first electron accelerator 31 may be coupled to one side of the purification reactor 1. For example, as shown in FIG. 3, the first electron accelerator 31 may be coupled to one lateral side of the purification reactor 1. The first electron accelerator 31 may irradiate an electron beam to the purification reactor 1. For example, the first electron accelerator 31 may generate an electron beam whose energy is as low as about 0.5 MeV or less, and may irradiate the electron beam to the purification reactor 1. In this sense, the first electron accelerator 31 may be a low-energy electron accelerator.

The second electron accelerator 33 may be positioned in the purification housing HS. In some embodiments, the second electron accelerator 33 may be supported by the shield plate 9. The second electron accelerator 33 may be coupled to another side of the purification reactor 1. For example, as shown in FIG. 3, the second electron accelerator 33 may be coupled to another lateral side of the purification reactor 1. The second electron accelerator 33 may irradiate an electron beam to the purification reactor 1. For example, the second electron accelerator 33 may generate an electron beam whose energy is as low as about 0.5 MeV or less, and may irradiate the electron beam to the purification reactor 1. In this sense, the second electron accelerator 33 may be a low-energy electron accelerator.

In some embodiments, the purification reactor 1, the first electron accelerator 31, and the second electron accelerator 33 may be arranged in a horizontal direction. For example, as shown in FIG. 3, the second electron accelerator 33, the purification reactor 1, and the first electron accelerator 31 may be arranged side by side in the second direction D2. Embodiments of the present disclosure, however, are not limited thereto, and the purification reactor 1, the first electron accelerator 31, and the second electron accelerator 33 may be arranged in a vertical direction.

The inlet duct 51 may be coupled to the purification reactor 1. The inlet duct 51 may send purification-target air to the purification reactor 1. At least a portion of the inlet duct 51 may be positioned in the purification housing HS. In some embodiments, the inlet duct 51 may be supported by the shield plate 9. The inlet duct 51 may have a crooked shape. For example, the inlet duct 51 may include a first inlet duct 511, a second inlet duct 512, a third inlet duct 513, a fourth inlet duct 514, and a fifth inlet duct 515.

The first inlet duct 511 may extend in the first direction D1 from the purification reactor 1. The second inlet duct 512 may be coupled to the first inlet duct 511. The second inlet duct 512 may have a curved shape. For example, as shown in FIG. 3, the second inlet duct 512 may have a shape that is bent at an angle of about 90°. The third inlet duct 513 may extend in a direction that intersects the extending direction of the first inlet duct 511. For example, the third inlet duct 513 may extend in the second direction D2. The third inlet duct 513 may be connected to the first inlet duct 511. For example, as shown in FIG. 3, the third inlet duct 513 may be connected through the second inlet duct 512 to the first inlet duct 511. Embodiments of the present disclosure, however, are not limited thereto, and the third inlet duct 513 may be directly connected to the first inlet duct 511.

The fourth inlet duct 514 may be coupled to the third inlet duct 513. The fourth inlet duct 514 may have a curved shape. For example, as shown in FIG. 3, the fourth inlet duct 514 may have a shape that is bent at an angle of about 90°. The fifth inlet duct 515 may extend in a direction that intersects the extending direction of the third inlet duct 513. For example, the fifth inlet duct 515 may extend in the first direction D1. The fifth inlet duct 515 may be connected to the third inlet duct 513. For example, as shown in FIG. 3, the fifth inlet duct 515 may be connected through the fourth inlet duct 514 to the third inlet duct 513. Embodiments of the present disclosure, however, are not limited thereto, and the fifth inlet duct 515 may be directly connected to the third inlet duct 513. The fifth inlet duct 515 may penetrate the purification housing HS.

The outlet duct 53 may be coupled to the purification reactor 1. The outlet duct 53 may allow the purified air to escape from the purification reactor 1. At least a portion of the outlet duct 53 may be positioned in the purification housing HS. In some embodiments, the outlet duct 53 may be supported by the shield plate 9. The outlet duct 53 may have a crooked shape. For example, the outlet duct 53 may include a first outlet duct 531, a second outlet duct 532, a third outlet duct 533, a fourth outlet duct 534, and a fifth outlet duct 535.

The first outlet duct 531 may extend in the first direction D1 from the purification reactor 1. The second outlet duct 532 may be coupled to the first outlet duct 531. The second outlet duct 532 may have a curved shape. For example, as shown in FIG. 3, the second outlet duct 532 may have a shape that is bent at an angle of about 90°. The third outlet duct 533 may extend in a direction that intersects the extending direction of the first outlet duct 531. For example, the third outlet duct 533 may extend in the second direction D2. The third outlet duct 533 may be connected to the first outlet duct 531. For example, as shown in FIG. 3, the third outlet duct 533 may be connected through the second outlet duct 532 to the first outlet duct 531. Embodiments of the present disclosure, however, are not limited thereto, and the third outlet duct 533 may be directly connected to the first outlet duct 531.

The fourth outlet duct 534 may be coupled to the third outlet duct 533. The fourth outlet duct 534 may have a curved shape. For example, as shown in FIG. 3, the fourth outlet duct 534 may have a shape that is bent at an angle of about 90°. The fifth outlet duct 535 may extend in a direction that intersects the extending direction of the third outlet duct 533. For example, the fifth outlet duct 535 may extend in the first direction D1. The fifth outlet duct 535 may be connected to the third outlet duct 533. For example, as shown in FIG. 3, the fifth outlet duct 535 may be connected through the fourth outlet duct 534 to the third outlet duct 533. Embodiments of the present disclosure, however, are not limited thereto, and the fifth outlet duct 535 may be directly connected to the third outlet duct 533. The fifth outlet duct 535 may penetrate the purification housing HS.

The upper cable shield member 81 may be connected to the first electron accelerator 31 and/or the second electron accelerator 33. The upper cable shield member 81 may be connected to a cable shield member 61 which will be discussed below. The upper cable shield member 81 may envelop a power supply cable C1. For example, the upper cable shield member 81 may protect the power supply cable C1. The upper cable shield member 81 may prevent radiation leakage.

The upper cooling shield member 83 may be connected to the first electron accelerator 31 and/or the second electron accelerator 33. The upper cooling shield member 83 may be connected to the cooling shield member 63 which will be discussed below. The upper cooling shield member 83 may envelop a coolant supply pipe C2. The upper cooling shield member 83 may protect a coolant supply pipe C2. The upper cooling shield member 83 may prevent radiation leakage.

The supply chamber SP may include a power supply device 2 (e.g., a power supply), a cooling device 4 (e.g., a cooler), a cable shield member 61, and a cooling shield member 63.

The power supply device 2 may provide power to each of the first electron accelerator 31 and the second electron accelerator 33. The power supply device 2 may be connected through the power supply cable C1 to each of the first electron accelerator 31 and the second electron accelerator 33.

The cooling device 4 may provide a coolant or cooling water to each of the first electron accelerator 31 and the second electron accelerator 33. The power supply device 2 may be connected through the coolant supply pipe C2 to each of the first electron accelerator 31 and the second electron accelerator 33.

The cable shield member 61 may envelop the power supply cable C1. The cable shield member 61 may be coupled to a bottom surface of the shield plate 9. The cable shield member 61 may include a curvature portion that is bent in a curved shape. For example, as shown in FIG. 2, the cable shield member 61 may have a shape bent at an angle of about 90°. The cable shield member 61 may prevent radiation leakage.

The cooling shield member 63 may envelop the coolant supply pipe C2. The cooling shield member 63 may be coupled to the bottom surface of the shield plate 9. The cooling shield member 63 may include a curvature portion that is bent in a curved shape. For example, as shown in FIG. 2, the cooling shield member 63 may have a shape bent at an angle of about 90°. The cooling shield member 63 may prevent radiation leakage.

Figure 4:
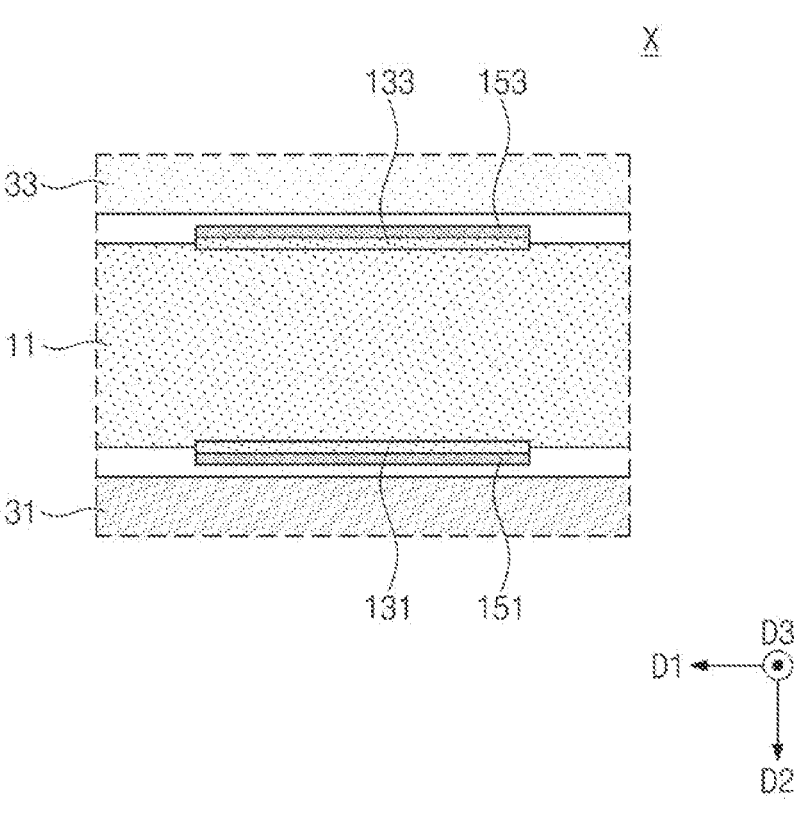
FIG. 4 illustrates an enlarged plan view showing section X of FIG. 3.
Figure 5:
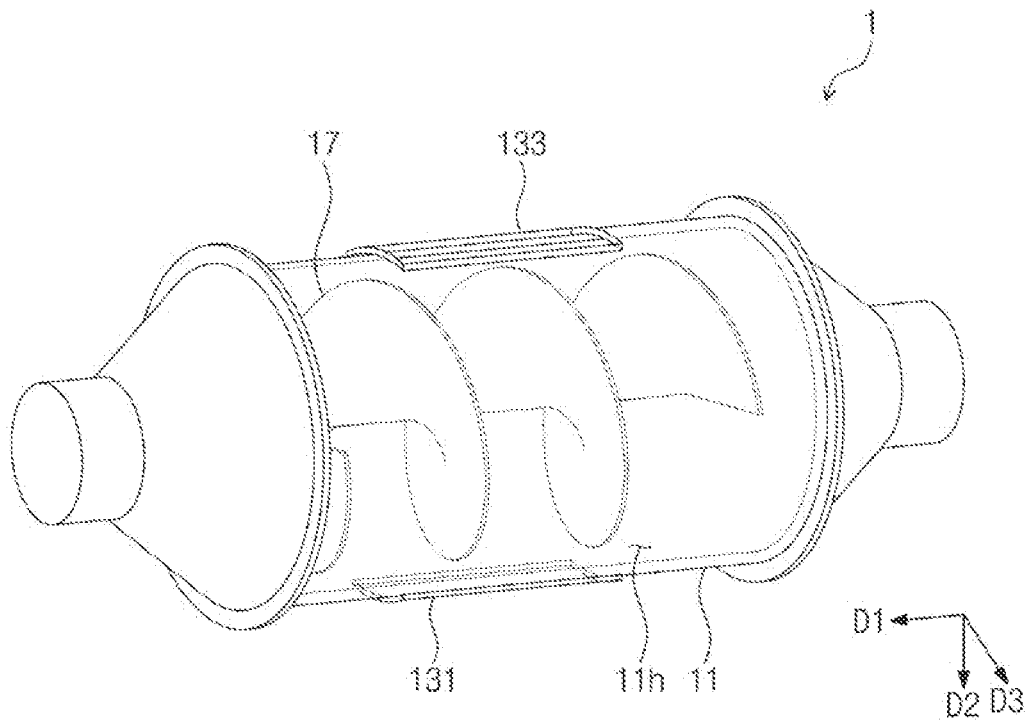
FIG. 5 illustrates a perspective view showing a purification reactor according to some embodiments of the present disclosure.

FIG. 4 illustrates an enlarged plan view showing section X of FIG. 3. FIG. 5 illustrates a perspective view showing a purification reactor according to some embodiments of the present disclosure.

Referring to FIGS. 4 and 5, the purification reactor 1 may include a reactor housing 11, a first window 131, a second window 133, a first door 151, a second door 153, and a helical structure 17.

The reactor housing 11 may provide a purification space 11h. Air purification may be performed in the reactor housing 11. One side of the reactor housing 11 may be connected to the inlet duct (see inlet duct 51 of FIG. 3), and another side of the reactor housing 11 may be connected to the outlet duct (see outlet duct 53 of FIG. 3). The reactor housing 11 may have a hollow cylindrical shape, but embodiments of the present disclosure are not limited thereto.

The first window 131 may be coupled to one lateral side of the reactor housing 11. The first window 131 may be directed toward the first electron accelerator 31. The first window 131 may include glass, but embodiments of the present disclosure are not limited thereto. The first window 131 may expose the purification space 11h to the first electron accelerator 31. For example, an electron beam irradiated from the first electron accelerator 31 may pass through the first window 131 to reach the purification space 11h.

The second window 133 may be coupled to another lateral side of the reactor housing 11. For example, the second window 133 may be positioned opposite to the first window 131 across the reactor housing 11. The second window 133 may be directed toward the second electron accelerator 33. The second window 133 may include glass, but embodiments of the present disclosure are not limited thereto. The second window 133 may expose the purification space 11h to the second electron accelerator 33. For example, an electron beam irradiated from the second electron accelerator 33 may pass through the second window 133 to reach the purification space 11h.

The first door 151 may be coupled onto the first window 131. The first door 151 may selectively open or close the first window 131. For example, when the first door 151 is installed on the first window 131, an electron beam may not be allowed to pass through the first window 131 to enter or escape from the reactor housing 11. For another example, when the first door 151 moves and departs from the first window 131, an electron beam may be allowed to pass through the first window 131 to enter or escape from the reactor housing 11. The first door 151 may use various ways to open or close the first window 131. For example, a driving device (not shown) may be separately connected to the first door 151, and the driving device may drive the first door 151 to move in a vertical direction and/or in a horizontal direction. The first door 151 may include lead (Pb), but embodiments of the present disclosure are not limited thereto.

The second door 153 may be coupled onto the second window 133. The second door 153 may selectively open or close the second window 133. For example, when the second door 153 is installed on the second window 133, an electron beam may not be allowed to pass through the second window 133 to enter or escape from the reactor housing 11. For another example, when the second door 153 moves and departs from the second window 133, an electron beam may be allowed to pass through the second window 133 to enter or escape from the reactor housing 11. The second door 153 may use various ways to open or close the second window 133. For example, a driving device (not shown) may be separately connected to the second door 153, and the driving device may drive the second door 153 to move in a vertical direction and/or in a horizontal direction. The second door 153 may include lead (Pb), but embodiments of the present disclosure are not limited thereto.

The helical structure 17 may be positioned in the reactor housing 11. The helical structure 17 may have a screw shape. The helical structure 17 may be fixed to a certain location. When air is introduced into the reactor housing 11, the helical structure 17 may compel the air to move while rotating.

Figure 6:
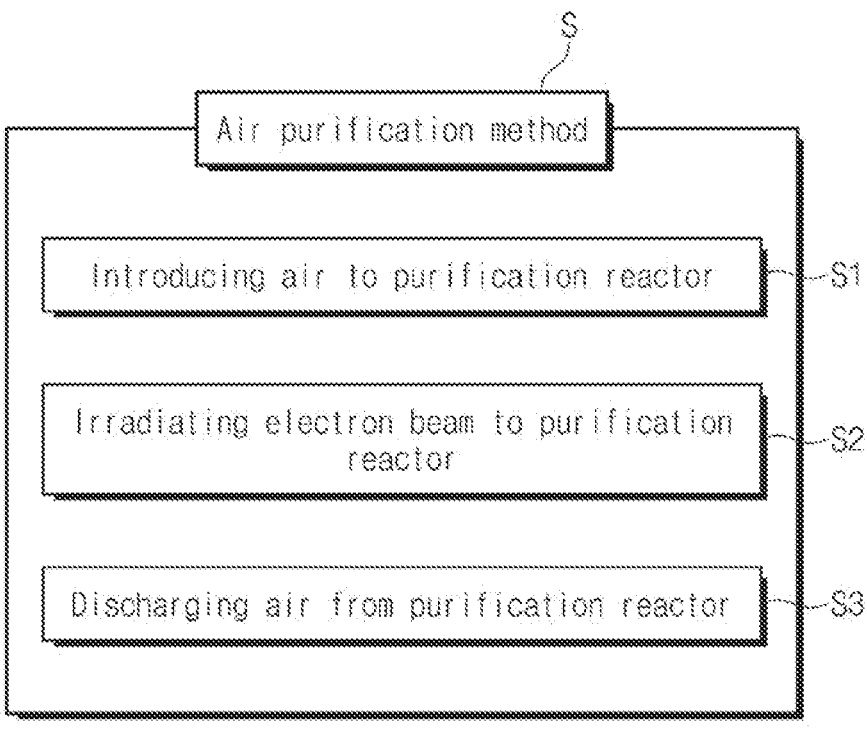
FIG. 6 illustrates a flow chart showing an air purification method according to some embodiments of the present disclosure.

FIG. 6 illustrates a flow chart showing an air purification method according to some embodiments of the present disclosure.

Referring to FIG. 6, an air purification method S may be provided. The air purification method S may include a step S1 of introducing air into a purification reactor, a step S2 of irradiating an electron beam to the purification reactor, and a step S3 of discharging the air from the purification reactor.

The irradiation step S2 may include stopping the second electron accelerator 33 and operating the first electron accelerator 31 to irradiate a first electron beam to the purification reactor 1, and thereafter stopping the first electron accelerator 31 and operating the second electron accelerator 33 to irradiate a second electron beam to the purification reactor 1.

With reference to FIGS. 7 to 10, the following will sequentially discuss the step S1, the step S2, and the step S3 included in the air purification method S of FIG. 6.

FIGS. 7 to 10 illustrate diagrams showing an air purification method according to the flow chart of FIG. 6.

Figure 7:
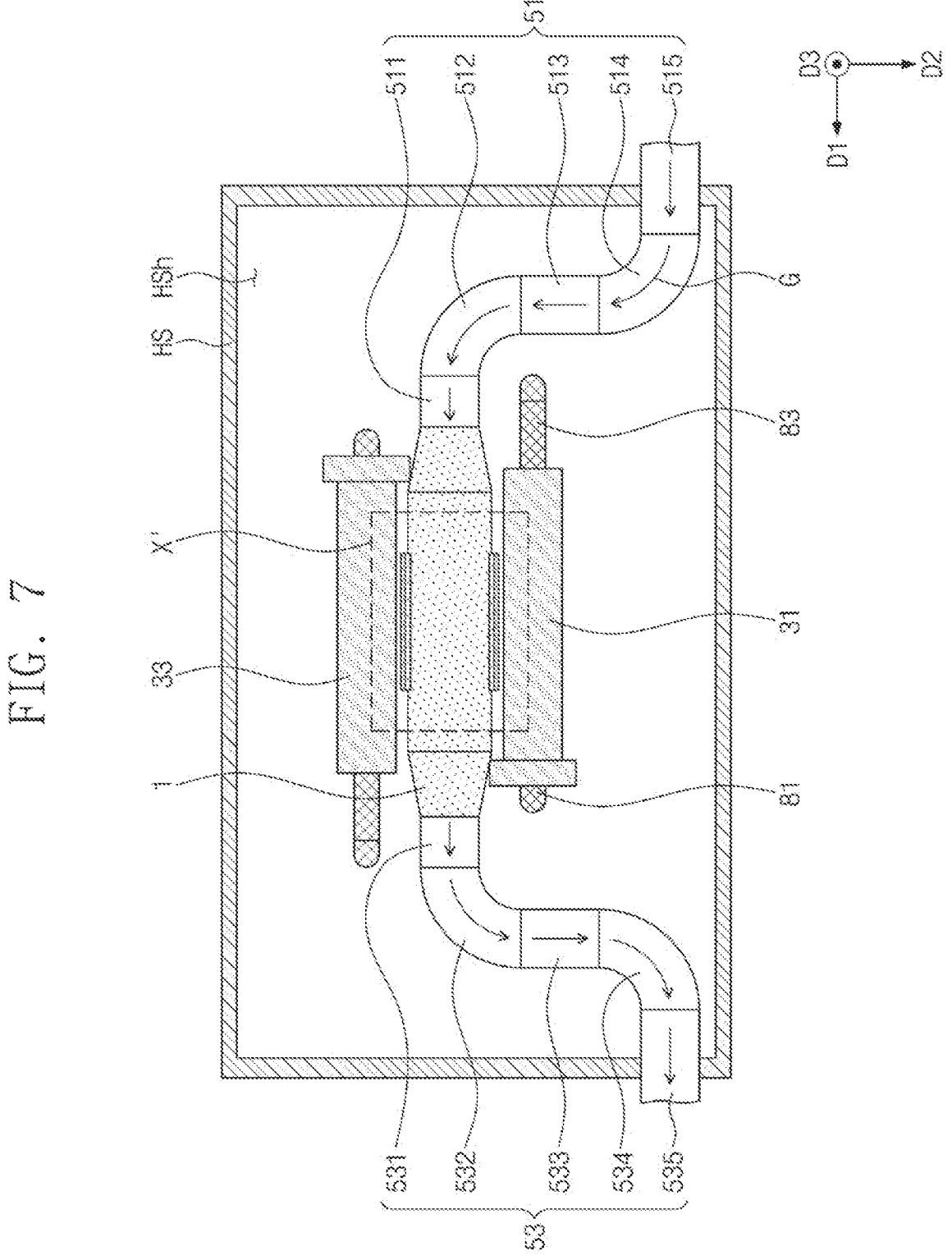
FIGS. 7 to 10 illustrate diagrams showing an air purification method according to the flow chart of FIG. 6.

Referring to FIGS. 6 and 7, the step S1 may include allowing air G to move in the first direction D1 through the inlet duct 51, and allowing air G to move in the second direction D2 through the inlet duct 51. In this step, the air G may travel in a meandering route through the inlet duct 51. For example, the air G may travel in the first direction D1 through the fifth inlet duct 515, and then may turn to the second direction D2 at the fourth inlet duct 514. Afterwards, the air G may flow in the second direction D2 through the third inlet duct 513. The air G may turn back to the first direction D1 at the second inlet duct 512, and then may move in the first direction D1 through the first inlet duct 511 to enter the reactor housing 11.

Figure 8:
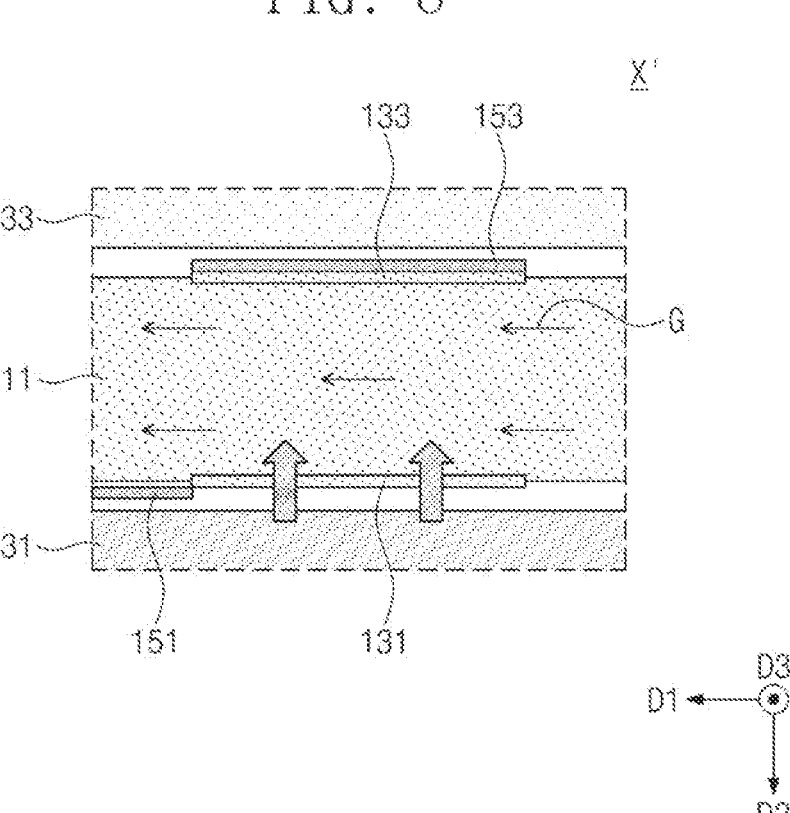

Referring to FIGS. 6 and 8, the irradiation of the first electron beam to the purification reactor 1 may include allowing the first electron beam irradiated from the first electron accelerator 31 to pass through the first window 131. In this step, the first door 151 may be opened. For example, the irradiation of the first electron beam to the purification reactor 1 may further include opening the first door 151. While the first electron beam is irradiated, the second door 153 may be closed. Therefore, the first electron beam may not escape through the second window 133 from the reactor housing 11. The first electron beam may eliminate harmful substances contained in the air G introduced into the reactor housing 11. In some embodiments, the irradiation of the first electron beam to the purification reactor 1 may continue for about 3 hours to about 9 hours. For example, the irradiation of the first electron beam to the purification reactor 1 may continue for about 4 hours to about 8 hours. A detailed description thereof will be further discussed below.

In some embodiments, the irradiation of the first electron beam to the purification reactor 1 may further include supplying the first electron accelerator 31 with power. The supply of power may be performed by the power supply device (see power supply device 2 of FIG. 2).

In some embodiments, the irradiation of the first electron beam to the purification reactor 1 may further include supplying the first electron accelerator 31 with a coolant or cooling water. The supply of coolant may be performed by the cooling device (see cooling device 4 of FIG. 2).

Figure 9:
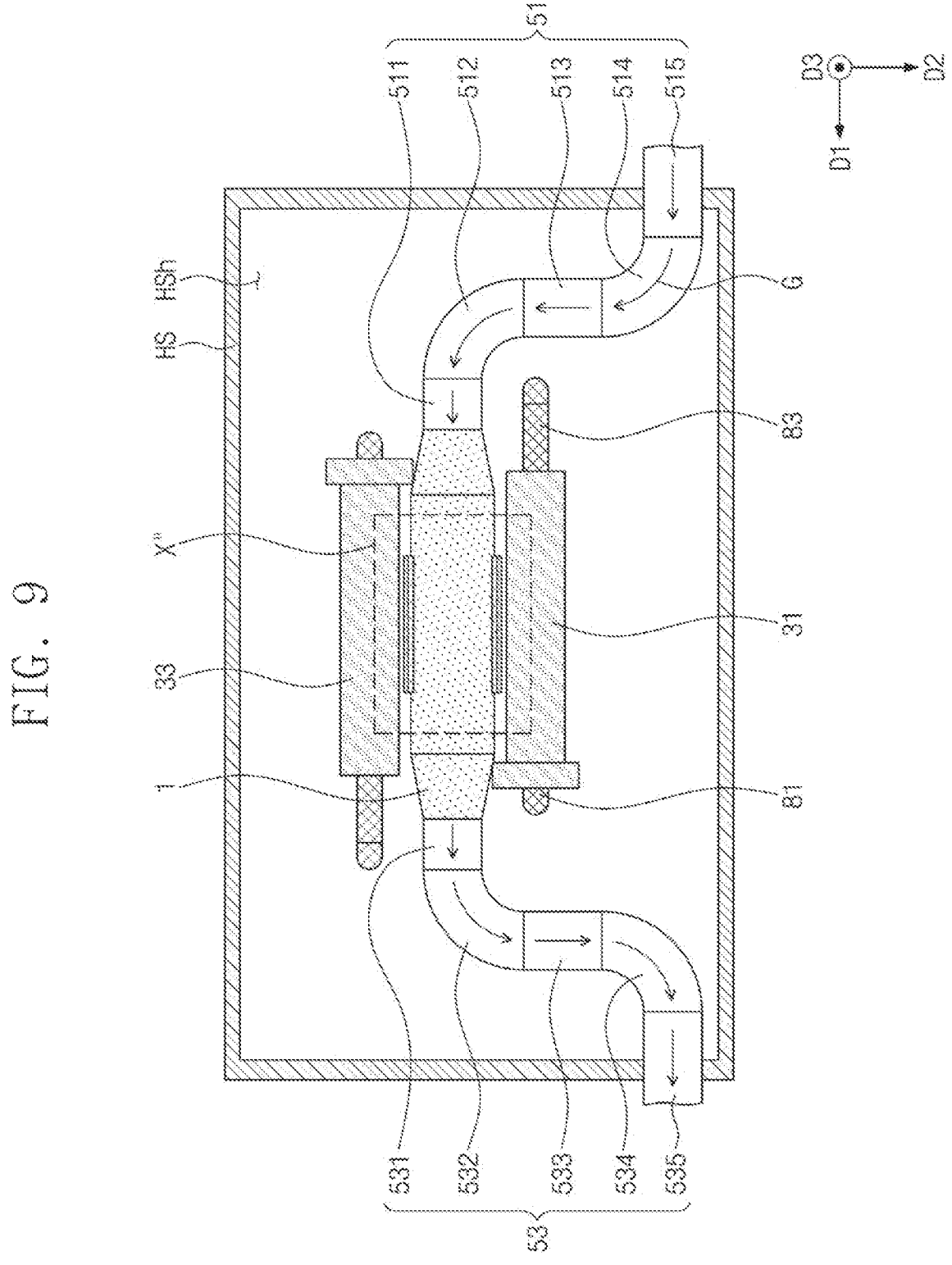

Referring to FIGS. 6 and 9, the step S3 may include allowing the air G to move in the first direction D1 through the outlet duct 53 and allowing the air G to move in the second direction D2 through the outlet duct 53. In this step, the air G may travel in a meandering route through the outlet duct 53. For example, the air G may travel in the first direction D1 through the first outlet duct 531, and then may turn to the second direction D2 at the second outlet duct 532. Afterwards, the air G may flow in the second direction D2 through the third outlet duct 533. The air G may turn back to the first direction D1 at the fourth outlet duct 534, and then may move in the first direction D1 through the fifth outlet duct 535 to escape from the reactor housing 11.

Figure 10:
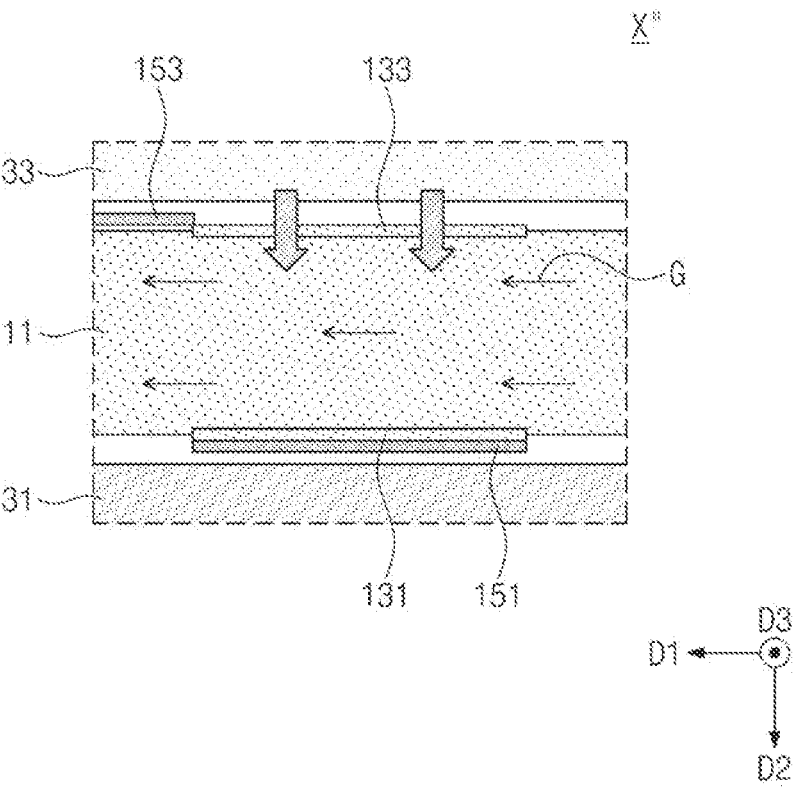

Referring to FIGS. 6 and 10, the irradiation of the second electron beam to the purification reactor 1 may include allowing the second electron beam irradiated from the second electron accelerator 33 to pass through the second window 133. In this step, the second door 153 may be opened. For example, the irradiation of the second electron beam to the purification reactor 1 may further include opening the second door 153. While the second electron beam is irradiated, the first door 151 may be closed. Therefore, the second electron beam may not escape through the first window 131 from the reactor housing 11. The second electron beam may eliminate harmful substances contained in the air G introduced into the reactor housing 11. In some embodiments, the irradiation of the second electron beam to the purification reactor 1 may continue for about 3 hours to about 9 hours. For example, the irradiation of the second electron beam to the purification reactor 1 may continue for about 4 hours to about 8 hours. A detailed description thereof will be further discussed below.

Figure 11:
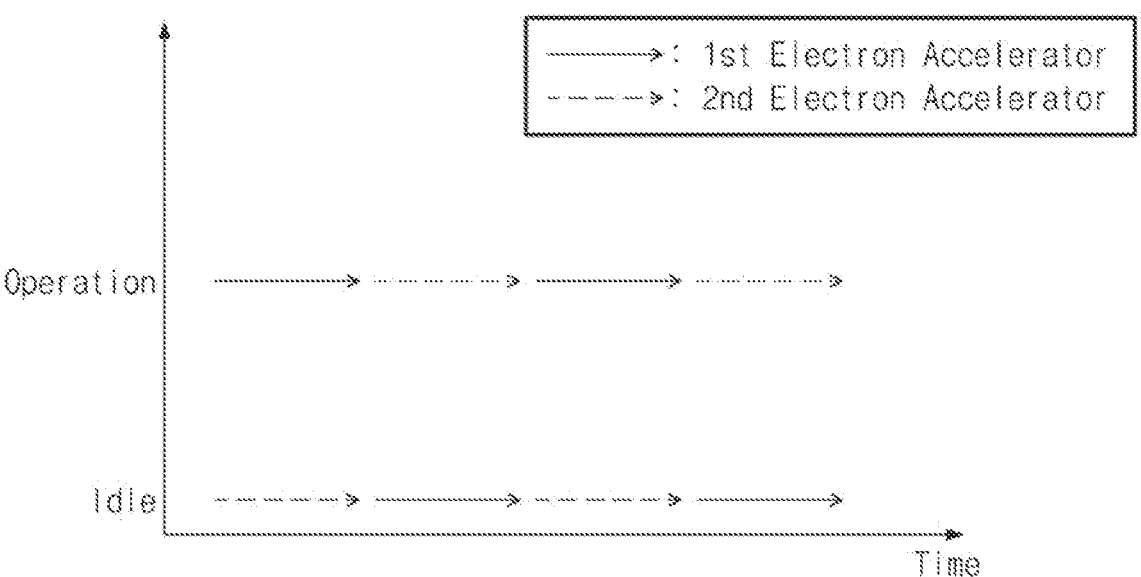
FIG. 11 illustrates a graph showing an air purification method according to some embodiments of the present disclosure.

FIG. 11 illustrates a graph showing an air purification method according to some embodiments of the present disclosure.

Referring to FIG. 11, the irradiation of the first electron beam and the irradiation of the second electron beam may be performed sequentially and alternately. For example, as shown in the graph of FIG. 11, while the first electron accelerator 31 (see FIG. 2) operates, the second electron accelerator 33 (see FIG. 2) may have an idle time. In contrast, while the second electron accelerator 33 operates, the first electron accelerator 31 may have an idle time. Accordingly, one electron accelerator may have an idle time after a certain operating time.

According to an air purification apparatus and an air purification method in accordance with some embodiments of the present disclosure, two electron accelerators may be alternately used to execute air purification. For example, while one electron accelerator operates, the other electron accelerator may have an idle time. Accordingly, the electron accelerator may not be required to continuously operate, which may result in an increase in lifespan of the electron accelerator. Furthermore, air purification may be performed without interruption.

According to an air purification apparatus and an air purification method in accordance with some embodiments of the present disclosure, radiation leakage may be prevented by a purification housing and/or a shield plate. Therefore, it may be possible to secure the safety of workers around the air purification apparatus.

According to an air purification apparatus and an air purification method in accordance with some embodiments of the present disclosure, an inlet duct and/or an outlet duct may be curved to have a crooked shape. Therefore, radioactive rays may be prevented from being discharged from a reactor housing to an outside of a purification housing through the input duct and/or the outlet duct. Moreover, as a cable shield member and/or a cooling shield member are also curved to have a crooked shape, radiation leakage may be blocked.

According to embodiments of the present disclosure, the air purification apparatus A may include a controller that is configured to control one or more (including all) of the power supply device 2, the cooling device 4, the first electron accelerator 31, the second electron accelerator 33, the first door 151, and the second door 153 to perform their respective functions. According to embodiments of the present disclosure, the controller may include at least one processor and memory storing computer instructions. The computer instructions, when executed by the at least one processor, may configured cause the controller to perform its functions. According to embodiments, the controller may control the air purification apparatus A to perform the air purification method S. According to embodiments, the controller may control the first electron accelerator 31 and the second electron accelerator 33 to irradiate the first electron beam and the second electron beam sequentially and alternately. For example, the controller may control the first electron accelerator 31 and the second electron accelerator 33 by controlling power supply of the power supply device 2. According to embodiments, the controller may control the first door 151 and the second door 153 to open and close in correspondence with operation of the first electron accelerator 31 and the second electron accelerator 33, as described in the present disclosure. According to embodiments, the controller may control supply of coolant or cooling water of the cooling device 4 to the first electron accelerator 31 and the second electron accelerator 33.

Although the present disclosure has been described in connection with non-limiting example embodiments of the present disclosure illustrated in the accompanying drawings, it will be understood to those skilled in the art that various changes and modifications may be made without departing from the technical spirit of the present disclosure. It therefore will be understood that the embodiments described above are illustrative but not limitative in all aspects.

What is claimed is:

1. An air purification apparatus, comprising:
an air purification chamber;
a supply chamber coupled to the air purification chamber; and
a controller,
wherein the air purification chamber comprises:
    a purification reactor;
    a first electron accelerator that is configured to irradiate a first electron beam to the purification reactor; and
    a second electron accelerator that is configured to irradiate a second electron beam to the purification reactor,
wherein the supply chamber comprises a power supply that is configured to supply power to each of the first electron accelerator and the second electron accelerator,
wherein the second electron accelerator is opposite to the first electron accelerator across the purification reactor, and
wherein the controller is configured to control the first electron accelerator and the second electron accelerator to sequentially and alternately irradiate the first electron beam and the second electron beam to the purification reactor.

2. The air purification apparatus of claim 1, wherein the air purification chamber further comprises a shield plate on the supply chamber.

3. The air purification apparatus of claim 1, wherein the purification reactor comprises:
    a reactor housing that comprises a purification space;
    a first window coupled to the reactor housing, the first window configured to expose the purification space to the first electron accelerator; and
    a second window coupled to the reactor housing, the second window configured to expose the purification space to the second electron accelerator.

4. The air purification apparatus of claim 3, wherein the purification reactor further comprises:
    a first door that is configured to open and close the first window; and
    a second door that is configured to open and close the second window, and
    wherein the controller is further configured to control the first door and the second door to open sequentially and alternately such that the first electron accelerator and the second electron accelerator sequentially and alternately irradiate the first electron beam and the second electron beam to the purification reactor.

5. The air purification apparatus of claim 1, wherein the first electron accelerator, the purification reactor, and the second electron accelerator are sequentially disposed in a horizontal direction.

6. The air purification apparatus of claim 1, wherein the supply chamber further comprises a cooler that is configured supply cooling water or coolant to each of the first electron accelerator and the second electron accelerator.

7. The air purification apparatus of claim 1, further comprising
    an inlet duct that is configured to send purification-target air to the purification reactor;
    an outlet duct that is configured to allow purified air to escape from the purification reactor; and a purification housing that encloses the first electron accelerator and the second electron accelerator,
wherein the outlet duct comprises:
    a first outlet duct that extends in a first direction from the purification reactor;
    a second outlet duct that extends in a second direction from the first outlet duct, the second direction intersecting the first direction; and
    a third outlet duct that extends in a third direction from the second outlet duct, the third direction intersecting the second direction, and
wherein the first outlet duct and the second outlet duct are in the purification housing.

8. The air purification apparatus of claim 7, wherein the third outlet duct penetrates the purification housing, and
a portion of the third outlet duct is outside of the purification housing.

9. The air purification apparatus of claim 7, wherein the second electron accelerator is positioned opposite to the first electron accelerator across the purification reactor.

10. The air purification apparatus of claim 7, wherein the purification reactor comprises:
    a reactor housing that comprises a purification space;
    a helical structure in the reactor housing;
    a first window coupled to the reactor housing and directed toward the first electron accelerator; and
    a second window coupled to the reactor housing and directed toward the second electron accelerator.

11. The air purification apparatus of claim 7, wherein the inlet duct comprises:
    a first inlet duct that extends in the first direction and is connected to the purification reactor;
    a second inlet duct that extends in the second direction from the first inlet duct; and
    a third inlet duct that extends from the second inlet duct in the third direction that intersects the second direction,
wherein the first inlet duct and the second inlet duct are in the purification housing.

12. An air purification apparatus, comprising:
an air purification chamber; and
a supply chamber coupled to the air purification chamber,
wherein the air purification chamber comprises:
    a purification reactor;
    a first electron accelerator that is configured to irradiate a first electron beam to the purification reactor; and
    a second electron accelerator that is configured to irradiate a second electron beam to the purification reactor,
wherein the supply chamber comprises a power supply that is configured to supply power to each of the first electron accelerator and the second electron accelerator, and
wherein the second electron accelerator is opposite to the first electron accelerator across the purification reactor,
wherein the air purification chamber further comprises a shield plate on the supply chamber,
wherein each of the first electron accelerator and the second electron accelerator is connected to the power supply via a power supply cable,
wherein the power supply cable penetrates the shield plate,
wherein the supply chamber comprises a cable shield member that envelops a portion of the power supply cable, and wherein the cable shield member is coupled to a bottom surface of the shield plate.

13. The air purification apparatus of claim 12, wherein the cable shield member comprises a curvature portion that has a curved shape, and the power supply cable is curved within the curvature portion of the cable shield member.

14. An air purification method, comprising:

introducing air to a purification reactor of an air purification apparatus;

irradiating at least one electron beam to the purification reactor; and discharging the air from the purification reactor, wherein the air purification apparatus includes:

a first electron accelerator on one side of the purification reactor; and a second electron accelerator on another side of the purification reactor, and wherein the irradiating the at least one electron beam to the purification reactor comprises:

stopping operation of the second electron accelerator and operating the first electron accelerator to irradiate a first electron beam to the purification reactor; and stopping operation of the first electron accelerator and operating the second electron accelerator to irradiate a second electron beam to the purification reactor.

15. The air purification method of claim 14, wherein introducing the air to the purification reactor comprises:

allowing the air to move in a first direction through an inlet duct connected to the purification reactor; and allowing the air that has moved in the first direction to move in a second direction through the inlet duct, the second direction intersecting the first direction.

16. The air purification method of claim 14, wherein discharging the air from the purification reactor comprises:

allowing the air to move in a first direction through an outlet duct connected to the purification reactor; and allowing the air that has moved in the first direction to move in a second direction through the outlet duct, the second direction intersecting the first direction.

17. The air purification method of claim 14, wherein the irradiating the first electron beam to the purification reactor comprises:

opening a first door that is configured to open and close a first window of the purification reactor; and closing a second door that is configured to open and close a second window of the purification reactor, wherein the first window is configured to expose a purification space of the purification reactor to the first electron accelerator, and wherein the second window is configured to expose the purification space to the second electron accelerator.

18. The air purification method of claim 14, wherein irradiating the first electron beam to the purification reactor is performed for 3 hours to 9 hours.

19. The air purification method of claim 14, wherein irradiating the first electron beam to the purification reactor comprises allowing a power supply to supply the first electron accelerator with power.

20. The air purification method of claim 14, wherein irradiating the first electron beam to the purification reactor comprises allowing a cooler to supply the first electron accelerator with cooling water or coolant.

* * * * *